United States Patent
Yu et al.

(10) Patent No.: US 11,165,558 B2
(45) Date of Patent: Nov. 2, 2021

(54) SECURED COMPUTING

(71) Applicant: Nokia Technologies Oy, Espoo (FI)

(72) Inventors: Xixun Yu, Xi An (CN); Zheng Yan, Espoo (FI)

(73) Assignee: NOKIA TECHNOLOGIES OY, Espoo (FI)

(*) Notice: Subject to any disclaimer, the term of this patent is extended or adjusted under 35 U.S.C. 154(b) by 131 days.

(21) Appl. No.: 16/623,903

(22) PCT Filed: Jun. 20, 2017

(86) PCT No.: PCT/CN2017/089216
§ 371 (c)(1),
(2) Date: Dec. 18, 2019

(87) PCT Pub. No.: WO2018/232603
PCT Pub. Date: Dec. 27, 2018

(65) Prior Publication Data
US 2020/0136797 A1    Apr. 30, 2020

(51) Int. Cl.
*H04L 9/00* (2006.01)
*H04L 9/30* (2006.01)

(52) U.S. Cl.
CPC .......... *H04L 9/008* (2013.01); *H04L 9/3026* (2013.01)

(58) Field of Classification Search
CPC ........................ H04L 9/008; H04L 9/3026
See application file for complete search history.

(56) References Cited

U.S. PATENT DOCUMENTS

| | | | |
|---|---|---|---|
| 11,005,828 B1* | 5/2021 | Kapp | H04L 9/085 |
| 2008/0181403 A1* | 7/2008 | Sakamoto | H04L 9/3236 380/258 |

(Continued)

FOREIGN PATENT DOCUMENTS

| | | |
|---|---|---|
| CN | 104601586 A | 5/2015 |
| CN | 104811450 A | 7/2015 |

(Continued)

OTHER PUBLICATIONS

Goldwasser et al., "Delegating Computation: Interactive Proofs for Muggles", Journal of the ACM (JACM), vol. 62, No. 4, Article 27, May 2008, 10 pages.

(Continued)

*Primary Examiner* — Gary S Gracia
(74) *Attorney, Agent, or Firm* — Alston & Bird LLP

(57) ABSTRACT

According to an example aspect of the present invention, there is provided an apparatus comprising at least one processing core, at least one memory including computer program code, the at least one memory and the computer program code configured to cause the apparatus to receive an identifier of a function, encrypted input data, an encrypted computation result, encrypted random data and an encrypted output of the function, when run with the random data, obtain a homomorphic polynomial factorization of the function, comprising obtaining a decomposed representation of the function, the representation comprising a sum of polynomials, and verify that the computation result is correct by checking, whether a difference between the encrypted output and the encrypted computation result equals a value of the decomposed representation, wherein the encrypted random data and the encrypted input data are used as parameter values in the sum of polynomials.

20 Claims, 6 Drawing Sheets

(56) References Cited

U.S. PATENT DOCUMENTS

| | | | | |
|---|---|---|---|---|
| 2013/0339722 | A1* | 12/2013 | Krendelev | H04L 9/0637 713/150 |
| 2015/0154406 | A1* | 6/2015 | Naehrig | G06F 21/602 713/165 |
| 2016/0254912 | A1* | 9/2016 | Maniatakos | H04L 9/321 713/168 |
| 2016/0323098 | A1* | 11/2016 | Bathen | H04L 63/00 |
| 2016/0366180 | A1* | 12/2016 | Smith | H04W 12/043 |
| 2017/0070340 | A1* | 3/2017 | Hibshoosh | H04L 9/3026 |
| 2018/0139054 | A1* | 5/2018 | Chu | H04L 9/3247 |

FOREIGN PATENT DOCUMENTS

| | | |
|---|---|---|
| EP | 2753019 A1 | 7/2014 |
| WO | 2015/131394 A1 | 9/2015 |

OTHER PUBLICATIONS

Thaler, "Practical Verified Computation with Streaming Interactive Proofs", Dissertation, May 2013, 288 pages.

Setty et al., "Making Argument Systems for Outsourced Computation Practical (Sometimes)", Network & Distributed System Security Symposium (NDSS), 2012, 20 pages.

Setty et al., "Taking Proof-Based Verified Computation a Few Steps Closer to Practicality", USENIX Security, 2012, pp. 1-16.

Gennaro et al., "Non-Interactive Verifiable Computing: Outsourcing Computation to Untrusted Workers", Advances in Cryptology—CRYPTO 2010, 2010, pp. 465-482.

Fiore et al., "Publicly Verifiable Delegation of Large Polynomials and Matrix Computations, with Applications", ACM conference on Computer and communications security, Oct. 2012, pp. 501-512.

Kate et al., "Constant-Size Commitments to Polynomials and their Applications", International Conference on the Theory and Application of Cryptology and Information Security, Advances in Cryptology—ASIACRYPT, 2010, pp. 177-194.

Benabbas et al., "Verifiable Delegation of Computation over Large Datasets", Proceedings of the 31st annual conference on Advances in cryptology, Aug. 2011, pp. 111-131.

Setty et al., "Resolving the Conflict Between Generality and Plausibility in Verified Computation", Proceedings of the 8th ACM European Conference on Computer Systems, Apr. 2013, pp. 71-84.

Vu et al., "A Hybrid Architecture for Interactive Verifiable Computation", IEEE Symposium on Security and Privacy, May 19-22, 2013, pp. 223-237.

Rivest et al., "On Data Banks and Privacy Homomorphisms", Foundations of Secure Computation, Academia Press, 1978, 11 pages.

Gentry, "A Fully Homomorphic Encryption Scheme", Dissertation, Sep. 2009, 209 pages.

Parno et al., "How to Delegate and Verify in Public: Verifiable Computation from Attribute-based Encryption", Theory of Cryptography Conference, 2012, pp. 422-439.

Dijk et al., "Speeding up Exponentiation using an Untrusted Computational Resource", Designs, Codes and Cryptography, vol. 39, 2006, pp. 253-273.

Catalano et al., "Practical Homomorphic Macs for Arithmetic Circuits", Annual International Conference on the Theory and Applications of Cryptographic Techniques, Advances in Cryptology—EUROCRYPT, 2013, pp. 336-352.

Gennaro et al., "Fully Homomorphic Message Authenticators", International Conference on the Theory and Application of Cryptology and Information Security, Advances in Cryptology—ASIACRYPT, 2013, pp. 301-320.

Backes et al., "Verifiable Delegation of Computation on Outsourced Data", ACM SIGSAC conference on Computer & communications, Nov. 2013, pp. 863-874.

Boneh et al., "Homomorphic Signatures for Polynomial Functions", Annual International Conference on the Theory and Applications of Cryptographic Techniques, Advances in Cryptology—EUROCRYPT, 2011, pp. 149-168.

Chung et al., "Improved Delegation of Computation using Fully Homomorphic Encryption", Advances in Cryptology—CRYPTO, 2010, pp. 483-501.

Parno et al., "Pinocchio: Nearly Practical Verifiable Computation", IEEE Symposium on Security and Privacy, May 19-22, 2013, pp. 238-252.

Papadopoulos et al., "Lightweight Authentication of Linear Algebraic Queries on Data Streams", Proceedings of the 2013 ACM SIGMOD International Conference on Management of Data, Jun. 2013, pp. 881-892.

Atallah et al., "Securely Outsourcing Linear Algebra Computations", Proceedings of the 5th ACM Symposium on Information, Computer and Communications Security, Apr. 2010, pp. 48-59.

Benjamin et al., "Private and Cheating-Free Outsourcing of Algebraic Computations", Sixth Annual Conference on Privacy, Security and Trust, Oct. 1-3, 2008, pp. 240-245.

Canetti et al., "Two 1-Round Protocols for Delegation of Computation", IACR Cryptology ePrint Archive, Sep. 21, 2011, 22 pages.

Papamanthou et al., "Optimal Verification of Operations on Dynamic Sets", Advances in Cryptology—CRYPTO, 2011, pp. 91-110.

Joo et al., "Homomorphic Authenticated Encryption Secure Against Chosen-Ciphertext Attack", International Conference on the Theory and Application of Cryptology and Information Security, Advances in Cryptology—ASIACRYPT, 2014, pp. 173-192.

Feng et al., "An Efficient Protocol with Bidirectional Verification for Storage Security in Cloud Computing", IEEE Access, vol. 4, Oct. 25, 2016, pp. 7899-7911.

Vidhisha et al., "Preserving Privacy for Secure and Outsourcing for Linear Programming in Cloud Computing", arXiv, vol. 1, No. 2, 2012, 8 pages.

Yawale et al., "Third Party Auditing (TPA) for Data Storage Security in Cloud with Rc5 Algorithm", International Journal of Advanced Research in Computer Science and Software Engineering, vol. 3, No. 11, Nov. 2013, pp. 1032-1037.

Mishra et al., "A Privacy Preserving Repository for Securing Data Across the Cloud", 3rd International Conference on Electronics Computer Technology, Apr. 8-10, 2011, pp. 6-10.

Hu et al., "Efficient Verification of Data Encryption on Cloud Servers", Twelfth Annual Conference on Privacy, Security and Trust (PST), Jul. 23-24, 2014, pp. 314-321.

Yuan et al., "Efficient Public Integrity Checking for Cloud Data Sharing with Multi-user Modification", IEEE Conference on Computer Communications, Apr. 27-May 2, 2014, pp. 2121-2129.

Gennaro et al., "Quadratic Span Programs and Succinct NIZKs without PCPs", Annual International Conference on the Theory and Applications of Cryptographic Techniques, Advances in Cryptology—EUROCRYPT, 2013, pp. 626-645.

Brakerski et al., "(Leveled) Fully Homomorphic Encryption without Bootstrapping", Proceedings of the 3rd Innovations in Theoretical Computer Science Conference, Jan. 2012, pp. 309-325.

Yan et al., "Context-Aware Verifiable Cloud Computing", IEEE Access, vol. 5, Feb. 9, 2017, pp. 2211-2227.

Gentry et al., "Separating Succinct Non-Interactive Arguments from All Falsifiable Assumptions", Proceedings of the forty-third annual ACM symposium on Theory of computing, Jun. 2011, pp. 99-108.

Attrapadung et al., "Computing on Authenticated Data: New Privacy Definitions and Constructions", International Conference on the Theory and Application of Cryptology and Information Security, Advances in Cryptology—ASIACRYPT, 2012, pp. 367-385.

International Search Report and Written Opinion received for corresponding Patent Cooperation Treaty Application No. PCT/CN2017/089216, dated Mar. 26, 2018, 9 pages.

Papamanthou et al., "Publicly Verifiable Delegation of Computation", IACR Cryptology ePrint Archive, Nov. 2, 2011, pp. 1-23.

Catalano et al., "Authenticating Computation on Groups: New Homomorphic Primitives and Applications", International Conference on the Theory and Application of Cryptology and Information Security, 2014, pp. 1-30.

Extended European Search Report received for corresponding European Patent Application No. 17914547.9, dated Dec. 15, 2020, 7 pages.

(56) References Cited

OTHER PUBLICATIONS

Canetti et al., "Verifiable Set Operations over Outsourced Databases", Proceedings of the 17th International Conference on Public-Key Cryptography, PKC 2014, vol. 8383, Mar. 2014, pp. 113-130.

* cited by examiner

SECURED COMPUTING

RELATED APPLICATION

This application was originally filed as PCT Application No. PCT/CN2017/089216, filed on Jun. 20, 2017.

FIELD

The present invention relates to secured distributed computing, for example in the context of cloud computing.

BACKGROUND

Traditionally data processing has been performed using different frameworks. In the 1960s and 1970s data processing was centralized to a relatively small number of computers, which were accessed by users with terminals. Subsequently, a proliferation of increasingly capable computers led to a distributed model, where corporations, research groups and even individuals performed their data processing using proprietary local computing substrates, such as PCs and servers.

In the future, it is foreseen that large numbers of relatively light computing devices, such as sensors or internet-of-things nodes, may generate large quantities of data, while these light devices may lack the processing resources to process. Consequently, cloud computing is one possible model where a return to the centralized framework is possible, such that light nodes provide their data to centralized, highly capable computing substrates for processing.

Cloud computing, however, faces challenges in situations where the cloud is not controlled by the same entity, such as a corporation, which generates the data. In detail, the data owner may not entirely trust a cloud operator to not be curious concerning the data, wherefore data may be encrypted for storage in a cloud.

In addition to storage, encryption provides the benefit of protecting data during transmission between the data owner and a computation substrate of a cloud data processing server.

When mere storage is not sufficient and the data owner desires to both store and process his data in a cloud such that the cloud operator is not enabled to discover the contents of the data, various cryptographic solutions may be considered.

Homomorphic encryption methods enable at least partial processing of encrypted data, such that the data that is the object of the processing is not revealed to the node performing the processing.

SUMMARY OF THE INVENTION

According to some aspects, there is provided the subject-matter of the independent claims. Some embodiments are defined in the dependent claims.

According to a first aspect of the present invention, there is provided an apparatus comprising at least one processing core, at least one memory including computer program code, the at least one memory and the computer program code being configured to, with the at least one processing core, cause the apparatus at least to receive an identifier of a function, encrypted input data, an encrypted computation result, encrypted random data and an encrypted output of the function, when run with the random data, obtain a homomorphic polynomial factorization of the function, comprising obtaining a decomposed representation of the function, the representation comprising a sum of polynomials, and verify that the computation result is correct by checking, whether a difference between the encrypted output and the encrypted computation result equals a value of the decomposed representation, wherein the encrypted random data and the encrypted input data are used as parameter values in the sum of polynomials.

Various embodiments of the first aspect may comprise at least one feature from the following bulleted list:
each polynomial in the sum of polynomials comprises a product of a first part and a second part, the first part comprising a difference between a first parameter and a second parameter and the second part comprising a polynomial expression involving the first parameter
the apparatus is configured to assign, in obtaining the value of the sum of polynomials, the encrypted random data as the first parameter and the encrypted input data as the second parameter
the apparatus is configured to receive the encrypted computation result from a result requesting party
the apparatus is configured to request the identifier of a function, the encrypted random data and the encrypted output of the function from a data provider node that originates the input data
the apparatus is further configured to request the encrypted input data from a cloud data processing node
the apparatus is further configured to indicate a result of the verification to a node from where the apparatus received the encrypted computation result
the apparatus is further configured to verify a second encrypted computation result using the same encrypted random data and encrypted output.

According to a second aspect of the present invention, there is provided an apparatus comprising at least one processing core, at least one memory including computer program code, the at least one memory and the computer program code being configured to, with the at least one processing core, cause the apparatus at least to perform a homomorphic polynomial factorization of a function to obtain a decomposed representation of the function, the representation comprising a sum of polynomials, obtain random data, and generate an output of the function, when run with the random data, and provide to a verifier node the random data in an encrypted form, the output in an encrypted form, and an identifier of the function, the verifier node distinct from a cloud computing server, wherein the apparatus is configured to offload computation of the function to the cloud computing server.

Various embodiments of the second aspect may comprise at least one feature from the following bulleted list:
the apparatus is further configured to provide encrypted input data and an instruction to the cloud computing server to perform the function on the encrypted input data
the apparatus is configured to encrypt the output and the random data using a homomorphic encryption key received in the apparatus from a proxy node
the apparatus is configured to encrypt the input data using a homomorphic encryption key received in the apparatus from a proxy node
the apparatus comprises a sensor node configured to function as part of a packet-based communication network.

According to a third aspect of the present invention, there is provided a method comprising receiving an identifier of a function, encrypted input data, an encrypted computation result, encrypted random data and an encrypted output of the function, when run with the random data, obtaining a homomorphic polynomial factorization of the function, comprising obtaining a decomposed representation of the function, the representation comprising a sum of polynomials, and verifying that the computation result is correct by checking, whether a difference between the encrypted output and the encrypted computation result equals a value of the decomposed representation, wherein the encrypted random data and the encrypted input data are used as parameter values in the sum of polynomials.

Various embodiments of the third aspect may comprise at least one feature corresponding to a feature from the preceding bulleted list laid out in connection with the first aspect.

According to a fourth aspect of the present invention, there is provided a method comprising performing a homomorphic polynomial factorization of a function to obtain a decomposed representation of the function, the representation comprising a sum of polynomials, obtaining random data, and generating an output of the function, when run with the random data, and providing to a verifier node the random data in an encrypted form, the output in an encrypted form, and an identifier of the function, the verifier node distinct from a cloud computing server, wherein an apparatus performing the method is configured to offload computation of the function to the cloud computing server.

Various embodiments of the fourth aspect may comprise at least one feature corresponding to a feature from the preceding bulleted list laid out in connection with the second aspect.

According to a fifth aspect of the present invention, there is provided an apparatus comprising means for receiving an identifier of a function, encrypted input data, an encrypted computation result, encrypted random data and an encrypted output of the function, when run with the random data, means for obtaining a homomorphic polynomial factorization of the function, comprising obtaining a decomposed representation of the function, the representation comprising a sum of polynomials, and means for verifying that the computation result is correct by checking, whether a difference between the encrypted output and the encrypted computation result equals a value of the sum of polynomials, wherein the encrypted random data and the encrypted input data are used as parameter values in the sum of polynomials.

According to a sixth aspect of the present invention, there is provided an apparatus comprising means for performing a homomorphic polynomial factorization of the function to obtain a decomposed representation of the function, the representation comprising a sum of polynomials, means for obtaining random data, and generate an output of the function, when run with the random data, and means for providing to a verifier node the random data in an encrypted form, the output in an encrypted form, and an identifier of the function, the verifier node distinct from a cloud computing server, wherein the apparatus is configured to offload computation of the function to the cloud computing server.

According to a seventh aspect of the present invention, there is provided a non-transitory computer readable medium having stored thereon a set of computer readable instructions that, when executed by at least one processor, cause an apparatus to at least receive an identifier of a function, encrypted input data, an encrypted computation result, encrypted random data and an encrypted output of the function, when run with the random data, obtain a homomorphic polynomial factorization of the function, comprising obtaining a decomposed representation of the function, the representation comprising a sum of polynomials, and verify that the computation result is correct by checking, whether a difference between the encrypted output and the encrypted computation result equals a value of the sum of polynomials, wherein the encrypted random data and the encrypted input data are used as parameter values in the sum of polynomials.

According to an eighth aspect of the present invention, there is provided a non-transitory computer readable medium having stored thereon a set of computer readable instructions that, when executed by at least one processor, cause an apparatus to at least perform a homomorphic polynomial factorization of the function to obtain a decomposed representation of the function, the representation comprising a sum of polynomials, obtain random data, and generate an output of the function, when run with the random data, and provide to a verifier node the random data in an encrypted form, the output in encrypted form, and an identifier of the function, the verifier node distinct from a cloud computing server, wherein the apparatus is configured to offload computation of the function to the cloud computing server.

According to a ninth aspect of the present invention, there is provided a computer program configured to cause a method in accordance with at least one of the third and fourth aspects to be performed.

EMBODIMENTS

A method to verify results of computation outsourced to a computing party is herein described, wherein polynomial factorization of a function is employed to enable determination of correctness of a computation result, using random data with a decomposition of the function. This method may be used, for example, in an Internet-of-things context where a data provider node provides data for processing in a server, and a requesting party may access the processed data such that the server doesn't gain access to the data itself. The determination of correctness may relate to the processing in the server.

Figure 1:
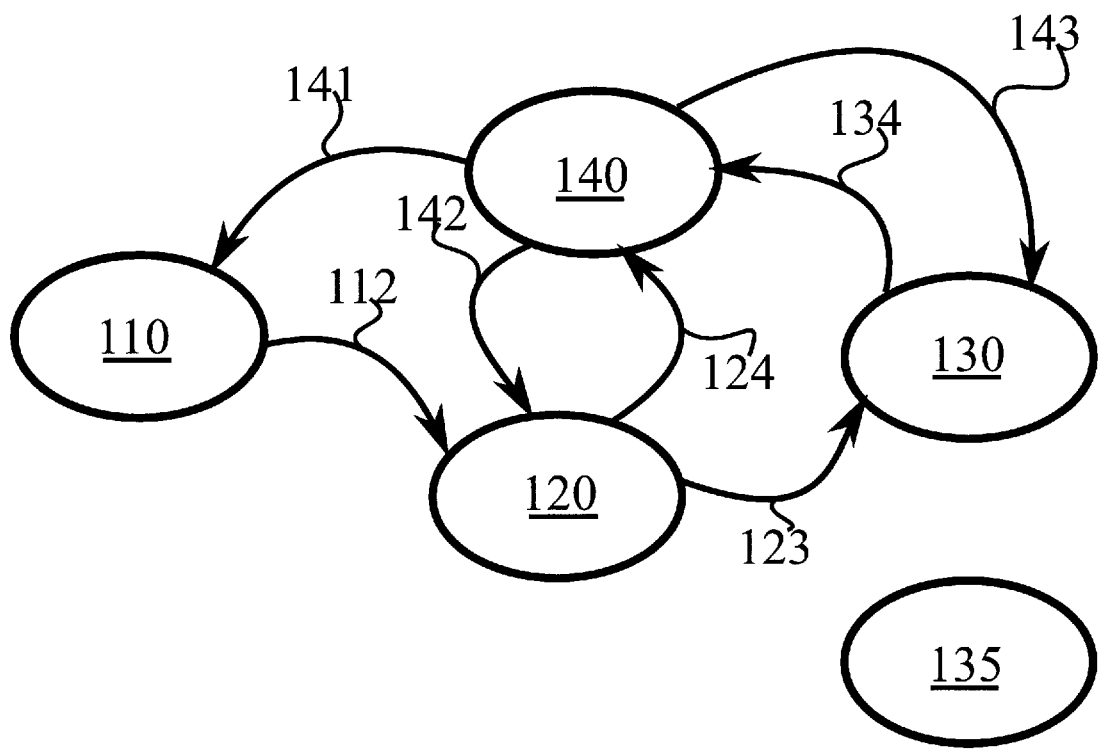
FIG. 1 illustrates an example system in accordance with at least some embodiments of the present invention.

FIG. 1 illustrates an example system in accordance with at least some embodiments of the present invention. FIG. 1 illustrates a computation flow.

The system of FIG. 1 comprises a data provider 110, which may comprise, for example, an Internet-of-things sensor node which generates sensor data, a user device such as a smartphone or tablet computer or another kind of suitable node. In general, a data provider 110 is a party that has a willingness to provide its data and outsource computation concerning this data. Data provider 110 may have limited computing resources or limited power resources, for example, wherefore data provider 110 may desire to offload computing and/or data storage tasks to another node. The data itself may comprise sensor data, such as seismographic, medical or atmospheric data, digital photographs, commercial or technical data. In some embodiments, the data comprises spread spectrum or multi-spectrum radar data which needs processing before use.

A proxy 140, which may be referred to as a trusted auditor proxy node, may be configured to provide homomorphic encryption keys to data provider 110. These keys may comprise a public key-secret key pair, for example. Proxy 140 may be configured to generate such keys, for example by using a random procedure, or proxy 140 may be configured to obtain such keys from a further node, and then provide them to data provider 110. A random procedure may comprise using thermal noise or radio noise, for example, to generate random numbers. A provision of such keys to data provider 110 is illustrated in FIG. 1 as message 141. Message 141 may be communicated over a packet-based communication network in a secure way by applying a security protocol, for example. Such a network may be wired or at least in part wireless, for example. Proxy 140 may comprise a network server, for example.

Server 120 may be comprised in a cloud computing cloud which comprises servers, for example. Server 120 has computational resources that are available for data provider 110 to offload computing tasks to. In general, server 120 may comprise or offer a computational substrate to other parties, such as, for example, data provider 110. Data provider 110 may provide a packet of its data, encrypted using the homomorphic encryption key, to server 120. This is illustrated in FIG. 1 as phase 112. Further, data provider 110 may provide a function or a function identifier, such that data provider 110 may request server 120 to process the data in accordance with the function. For example, the function may comprise a fast Fourier transform, wavelet transform, multiplication, addition or another mathematical processing. Server 120 may responsively perform the requested processing on the data. further, server 120 may obscure the result of the processing by multiplying it with a random number, or set of random numbers, to conceal the processed data from proxy 140. The processing performed in server 120 may be homomorphic in nature, by which it is meant server 120 does not gain knowledge of the data itself, despite performing processing on it. The processing may be performed on encrypted data without reversing the encryption for the processing to occur, in other words, without revealing the plaintext to server 120.

Once a requesting party 130, or 135 expresses a desire to obtain the result of the processing, it may transmit a request to proxy 140. This is illustrated as message 134 in FIG. 1. Proxy 140 may verify the requesting party 130 is authorized to obtain the result, after which proxy 140 may forward the request to server 120. This forwarding is illustrated as message 142 in FIG. 1. Server 120 may then issue the obscured computation result to proxy 140, message 124, and server 120 may deliver the random value or values used in the obscuring to requesting party 130, message 123. Message 123 may be encrypted with a public key of requesting party 130, for example.

Proxy 140 may re-encrypt the obscured data for requesting party 130 and forward the re-encrypted obscured data to requesting party 130, message 143. Requesting party 130 may then de-obscure the data to obtain the processed data. In some embodiments, server 120 does not obscure the result using random data. The messaging need not proceed exactly as illustrated in FIG. 1, for example, the re-encrypted data may be provided to requesting party from proxy 140 via server 120. As another example variant, the request of phase 134 may be transmitted to server 120, rather than proxy 140.

Figure 2:
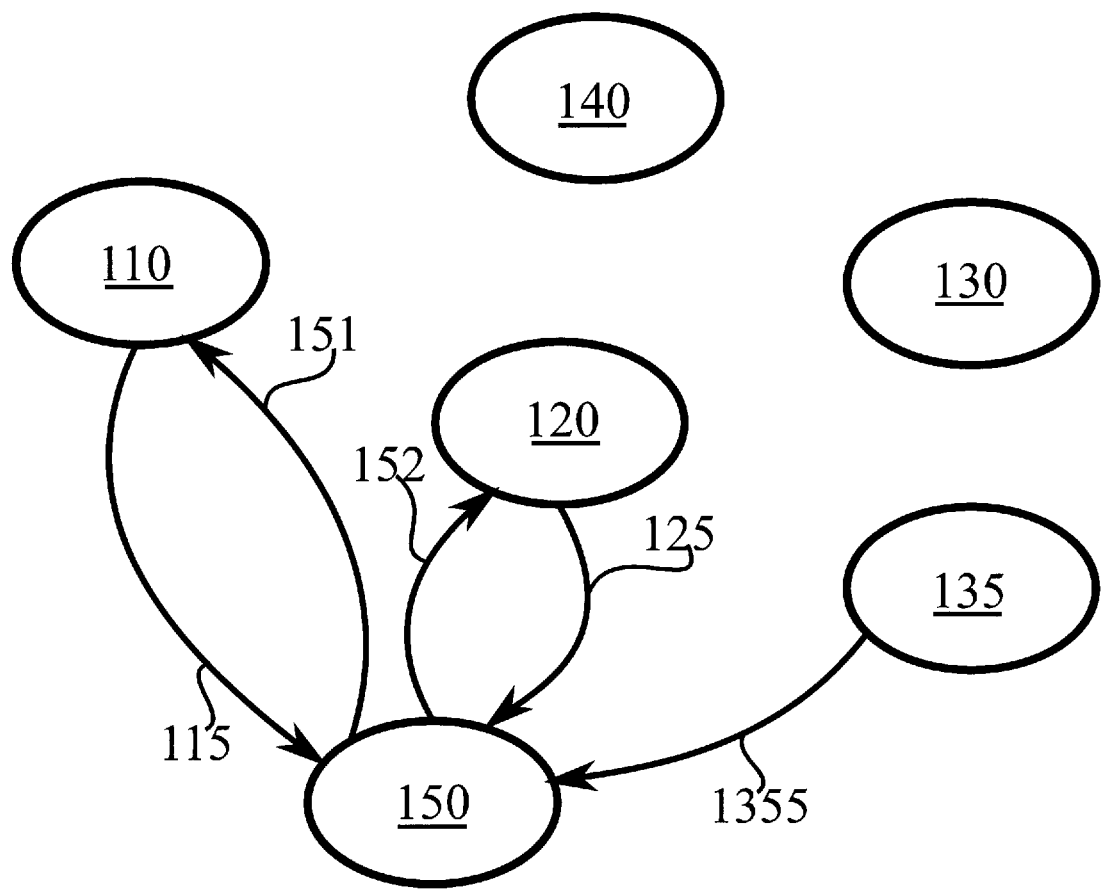
FIG. 2 illustrates an example system in accordance with at least some embodiments of the present invention.

FIG. 2 illustrates an example system in accordance with at least some embodiments of the present invention. FIG. 2 illustrates a verification flow.

The system of FIG. 2 resembles that of FIG. 1, with like numbering denoting like structure and features. The system of FIG. 2 further comprises a verifier 150. In practice, verifier 150 may be comprised in a same physical node as a requesting party. In that sense requesting party and verifier may be seen as functional roles a physical node may assume. The physical node may comprise a computer, such as a tablet, laptop or desktop computer, for example.

In FIG. 2, it is assumed that a computation process such as the one illustrated in FIG. 1 has been conducted, with the result that requesting party 135 is in possession of processed data. Initially, requesting party 135 issues an auditing request 1355 to verifier 150. Auditing request 1355 may comprise the processed data, in a homomorphically encrypted form. Verifier 150 may then request data from data provider 110, and responsively receive from the data provider a packet of data. These phases are illustrated as phases 151 and 115 in FIG. 2. The packet of data from data provider 110 may comprise encrypted random data and an encrypted output of the function, when run with this random data.

Verifier 150 may likewise request, phase 152, and receive, phase 125, an encrypted version of the unprocessed data from server 120. Verifier may then proceed to check if the processing was originally performed correctly in server 120. In detail, verifier 150 may use a homomorphic polynomial factorization of the function, as will be described in more detail herein below. Depending on the embodiment, verifier 150 may obtain the encrypted processed data from requesting party 135 or from server 120, for example.

In the verification, data provider 110 may be configured to make preparations for a future audit procedure by generating a verification algorithm according to a polynomial factorization algorithm. According to the verification algorithm, data provider 110 may choose random data as an input of the function and compute an output for this input, and then encrypts the random data and the output with the homomorphic encryption key pair for the purpose of verification. Verifier 150 who seeks to audit the correctness of the computation result at server 120 may request that data provider 110 provide the random data and the verification algorithm for performing auditing and verification. Concretely, verifier 150 may take these random data, the encrypted outsourced data and the computation result as inputs into the verification algorithm and further checks if the output of the verification algorithm is as expected in order to tell the correctness of the data processing result of server 120. Overall, verifier 150 may obtain the unprocessed data from data provider 110 or server 120, and the processed data from requesting party 135 or server 120, for example.

Verifiable computation is a technique of an outsourced computation service that helps clients to outsource their computations to server 120 with expected commitments. In a cloud computing scenario, clients and server 120 do not completely trust each other, thus, it is useful that server 120 may be requested to collaborate in proving that data computation processed by it is correct. Verifiable computation provides methods to audit data computation based on either computation complexity theorem, such as Probabilistically Checkable Proofs, PCPs, Non-interactive Proof, or cryptographic techniques such as Attribute-based Encryption ABE, Fully Homomorphic Encryption FHE, or others.

Goldwasser et al. proposed interactive proofs based on PCPs in [1], in which a client can check and verify results of computation but in doing so has to store a large amount of data locally. Unfortunately, although these schemes offer an impressive theoretical performance, the clients still need to own powerful computation capabilities to deal with complicated computation, which seems impractical in the real world. Owing to these issues, much research has been directed to improve the efficiency of PCP in order to make it more practical.

Thaler proposed a scheme in [2] that builds on the PCP-based arguments designed by Goldwasser et al. (named GKR protocol) in [1]. In [2], Thaler proposed specific functions to deal with streaming settings in parallel, where not all data can be stored to compute over. Moreover, this scheme does not use cryptography and is secure against computationally unbounded adversaries.

Setty et al. proposed another PCP-based system called linear PCP [3], [4]. In contrast to the original PCP, linear PCP represents proof as a linear function. In existing schemes, workers can generate a commitment to its proof by a linearly-homomorphic encryption scheme only based on some standard cryptographic assumptions. This method optimizes the traditional PCP-based schemes and makes it practical to utilize PCP-based schemes in the real world. Moreover, for applications that can tolerate large batch sizes, these schemes only cost a little in verification.

Non-interactive verifiable computation was first introduced by Gennaro et al. in [5]. It allows a computationally weak client to outsource its complex computation to a powerful server or operator, then the server or operator may return the result of the computation and generate a non-interactive proof for the result in order to help the client audit the correctness of the computation result. A number of constructions were proposed to increase the efficiency of performance, but most of them only permit limited functions such as polynomials [6], [7] and set operations [8].

Setty et al. [9] built a scheme based on the Quadratic Arithmetic Programs, QAPs, proposed by Gennaro et al. [8]. QAPs are similar to linear PCPs and can be similarly used in Ginger's cryptographic framework [3], [4]. Vu et al. [11] proposed to improve GKR's protocol [1] with a batching model and designed a compiler that chooses among three PCP-based back ends. However, in order to improve efficiency, these two schemes perform computations in batches. Thus, the client's secret key is exposed to a third party to conduct the verification on the outsourced computation result, which causes security risks related to the usage of verifiable computation in practice.

Fully Homomorphic Encryption, FHE, was first introduced by Rivest et al. [12] in 1978. Homomorphic Encryption, HE, enables meaningful computations on encrypted data without decrypting them. However, due to some cryptographic problems, candidate FHE schemes were not proposed until 2009. In 2009, the first FHE scheme was proposed by Gentry [13] called Somewhat Homomorphic Encryption, SHE, and it enables clients to evaluate a limited depth circuit consisting of additions and multiplications directly on encrypted data. Although due to its limits on circuit depth, this scheme did not totally conform to the notion of FHE, which inspired many researchers to make efforts to improve SHE to be a real FHE, [14]-[20]. Moreover, some other FHE schemes [21]-[24] were proposed based on different assumptions from Gentry's.

After the first FHE scheme, three main branches of homomorphic encryption have been developed: lattice-based, integer-based, and learning-with-errors, LWE, or ring-learning-with-errors, RLWE, based homomorphic encryption, which aim to solve problems in different fields such as integer, field, polynomial, etc. Furthermore, FHE provides a new path to realize outsourced computation in a secure and general way. But how to verify the correctness of FHE-based data computation has been an open issue.

In order to realize public verification, Parno et al. in [9] first raised two key properties of public verification that were not achieved in earlier solutions based on ABE. One property is public delegatability. Briefly, public delegatability means that several parties should be able to delegate their computations to the cloud. Traditional schemes [26]-[28] require extensive preprocessing for any input $x_i$ to compute $F(x_i)$ at the cloud. Clients may generate a secret key SKF, which may be small and an evaluation key EKF, which may be large, at first. In this situation, for those clients who only want to perform a computation once, the initialization phase could be a waste of computation resources. A lightweight system setup or initiation would be preferred.

Goldwasser, Kalai and Rothblum [1] presented a publicly delegatable verifiable computation protocol for functions that can be computed by circuits of size poly(n) and depth poly(log(n)), where poly(n) denotes an unspecified function $f(n)=o(n^c)$ for some constant c>0. This scheme improves the original one [5] as it does not need clients to perform prepossessing. Similarly, Canetti, Riva, and Rothblum in [30] investigated in another line of research and presented a protocol that relies on collision-resistant hashing and poly-logarithmic Private Information Retrieval, PIR, for general circuits C, where the client runs in time poly(log(|C|), depth(C)). However, the above two studies do not satisfy the requirements of public verifiability very well.

Another property of public verifiable computation is public verifiability. Concretely speaking, several parties should be able to verify the work of the server or cloud with a specially designed "verification" key. In the same situation mentioned above, a client may generate a verification key $VK_x$ for input x at the same time, for example, as it delegates the computation of function F to the cloud. This key enables the client to verify the correctness of the computation result without the involvement of the cloud. Moreover, even if the cloud knows the verification key $VK_x$, it is still impossible for the cloud to cheat on the result of the computation.

Papamanthou, Tamassia, and Triandopoulos [31] proposed a verifiable computation scheme for set operations that enables anyone to check the correctness of the set operation results. Parno et al. [23] designed a scheme for public verifiable computation called Pinocchio. This scheme achieves Public Verifiability of the operation result by combining QAPs and a highly efficient cryptographic protocol. In their scheme, proofs for operation results are constant no matter how many computations are executed. Thus, the computation result can be verified very efficiently. Papamanthou, Shi, and Tamassia [33] presented another protocol on public verifiable computation.

A system in accordance with at least some embodiments of the present invention will now be described.

The notion of fully homomorphic encryption was first introduced by Rivist in 1978. However, due to the technical limitations of that time, a promising scheme on fully homomorphic encryption had not been proposed until 2009 by Gentry. He first proposed a scheme called somewhat homomorphic encryption, SHE, using ideal lattices to realize a homomorphism that is able to compute a limited depth of circuits. Then he and his team improved this work and successfully constructed a fully homomorphic encryption scheme, FHE, based on ideal lattices. After Gentry first brought this theory in the real world, fully homomorphic encryption became an active topic in research. Among all of them, there are three main branches: fully homomophic encryption based on ideal lattices, fully homomorphic encryption based on integers, and fully homomorphic encryption based on Learning with Errors, LWE, or Ring Learning with Errors, RLWE. In at least some embodiments of this invention, a BGV [21] fully homomrophic encryption scheme is used, based on RLWE.

In this section, we briefly introduce the algorithms of fully homomrophic encryption that may be used in at least some embodiments of the invention. There are four algorithms in a fully homomrophic encryption scheme: Key Generation (Keygen), Encryption (Enc), Decryption (Dec), and Evaluate (Eval). The details are given below:

1) KeyGen($1^\lambda$)→(pk, sk): With the input a security parameter $\lambda$, the algorithm outputs a fully homomorphic public key pk, and a fully homomorphic secret key sk.

2) Enc(pk, $m_i$)→$\varphi_i$: With the inputs: public key pk and plaintext $m_i$, the algorithm encrypts m and outputs a ciphertext $\varphi_i$, where $m_i$ donates the ith plaintext provided by $DP_i$ and $\varphi_i$ donates the corresponding ciphertext of $m_i$.

3) Dec(pk, $\varphi_i$)→$m_i$: With the inputs: secret key sk and the ciphertext $\varphi_i$, the algorithm decrypts $\varphi_i$ and outputs plaintext $m_i$.

4) Eval(pk, C, Φ)→$\varphi$: With the inputs: public key pk, evaluated circuit C, and a tuple of ciphertext Φ (Φ=⟨$\varphi_1$, ..., $\varphi_t$⟩), the algorithm computes and outputs result which donates a ciphertext computation result, where C($m_i$, ..., $m_t$)=Dec(sk, $\varphi$).

The key algorithm of fully homomorphic encryption is Eval which computes the data in a ciphered form. Obviously, the encryption of data protects them from exposed to unauthorized users. Only the party who owns the secret key sk can get access to the plaintext result.

Next, polynomial factorization will be described. We now give the notation of multivariate polynomials. A key point is that we use a repeatable multiset which means an element can take place more than once to present a multivariate polynomial, e.g., {1,1,2,2,3,3} is a multiset. Formally, a function S→$Z^{≥0}$ donates a map between a multiset (S) and the multiplicity of each element in that multiset, i.e., S={1, 1,2,3,3,3}, we have S(1)=2, S(2)=1, S(3)=3. |S| denotes the degree of a multiset, i.e. for a multiset {1,1,2,3,3,3}, |S|=6. Finally, $S_{d,n}$ donates a set of multisets which have the size of at most d and different elements of at most n. Let $f$ be an n-variable polynomials over $Z_p$, then $f$ can be presented like this:

$$f(x) = f(x_1, x_2, \ldots, x_n) \in Z_p[x] = \sum_{s \in S_{d,n}} c_s \prod_{i \in s} x_i^{s(x_i)}$$

where $c_S$ donates the coefficient of the corresponding monomial multivariate polynomials. For example, the multiset {1,1,2,5,5,5} is corresponding to the n-variable polynomials $x_1^2 x_2 x_5^3$.

Specially, as to a multivariate polynomial, we use the maximum degree of the monomial that contains in the polynomial to donate the degree of that polynomial, e.g. $4x_1 x_2 + 3x_1^3 x_2^2 x_1$ has the degree of 6.

Multivariate Polynomials factorization: Let $f(x)=f(x_1, x_2, \ldots, x_n) \in Z_p^n[x]$ be a n-variable polynomial. For all a $\in Z_p^n$, there exists $q_i(x) \in Z_p^n[x]$ where $f(x)-f(a)$ can be presented as $f(x)-f(a)=\Sigma_{i=1}^n (x_1-a_1) q_i(x)$. Furthermore, there exists a polynomial-time algorithm to find these $q_i(x)$.

Proof: The proof of this factorization algorithm is straightforward. Given a n-variable polynomial $f(x)-f(a)$ over $Z_p$, we use $x_1-a_1$ to divide this polynomial to get $f(x)-f(a)=(x_1-a_1)q_1(x_1,x_2, \ldots, x_n)+r_1(x_2,x_3, \ldots, x_n)$ where $r_1(x_2, x_3, \ldots, x_n)$ is the remainder term which no longer contains the variable $x_1$. Continuously, divide the remainder with $(x_2-a_2)$, then with $(x_3-a_3)$, and so on. Finally, $f(x)-f(a)$ can be presented as:

$$f(x) - f(a) = \sum_{i=1}^{n} (x_i - a_i) q_i(x_1, x_2, \ldots, x_n) + r_n$$

where $r_n \in Z_p$. Since $f(x)-f(a)=0$ when x=a, $r_n$ should be 0 as well. So, we have $$f(x) - f(a) = \sum_{i=1}^{n} (x_i - a_i) q_i(x)$$

The following notations will be employed:

| Notation | Description | Remark |
|---|---|---|
| $PK_H$ | The HE public key generated by proxy | We use this notation to donate any public keys generated by proxy |
| $SK_H$ | The HE secret key generated by proxy | We use this notation to donate any secret keys generated by proxy |
| $PK_x$ | The public key of entity x | |
| $SK_x$ | The secret key of entity x | |
| $DP_i$ | The ith data provider | |
| $D_{i,j}$ | The data provided by $DP_i$ to input into data processing function $F_j$ | |
| $D_j$ | The set of $D_{i,j}$ to input into $F_j$ | |
| $F_j$ | The jth data computation function | |
| ra | The random number generated by server | ra should be different for different $F_j$ |
| $E(PK_H, D_{i,j})$ | The homomorphically encrypted data $D_{i,j}$ | |
| $DM_j$ | The plain data processing or computation result | |
| $E'(PK_x, SK_H)$ | The encryption of $SK_H$ with $PK_x$ | |
| $RD_{i,j}$ | The random data chosen by $DP_i$ with the same form of $D_{i,j}$ | $RD_{i,j}$ should be refreshed based on a time stamp |

-continued

| Notation | Description | Remark |
|---|---|---|
| $RDM_{i,j}$ | The plain data processing or computation result of $RD_{i,j}$ w.r.t. function $F_j$. | |
| $F_j'$ | The first-generation function w.r.t. $F_j$ | $F_j' \in Z_p^I[x] = F_j(x) - F_j(D_j)$, $x \in Z_p^I$. |
| $F_j''$ | The second-generation function w.r.t. $F_j$ that should be equal to $F_j'$ | $F_j'' \in Z_p^I[x] = \Sigma_{i=1}^I (x_i - D_{i,j})q_i(x)$ ($i = 1, \ldots, I$), $q_i(x)$ are the polynomials generated by multivariate polynomials factorization algorithm. |

For system setup, each system entity x generates its own public and private key pairs $PK_x$ and $SK_x$ and broadcasts its public key inside the system. Proxy 140 generates and issues a fully homomorphic encryption key pair $PK_H$ and $SK_H$ to each data provider $DP_i$ (i=1, ..., I). For different contexts, these keys can be set differently. Thus, in general, multiple homomorphic key pairs may exist in the system. For simplification, we use $PK_H$ to refer to any of these homomorphic public keys and $SK_H$ to refer to any of these homomorphic private keys.

Next, the data provision and computation phase will be described in more detail. $DP_i$ provides data $D_{i,j}$ with regard to function $F_j$. In order to hide the contents of the raw data and outsource its computation to server 120, $DP_i$ encrypts $D_{i,j}$ with $PK_H$ provided by proxy 140 associated with the function $F_j$ to generate a package $P\{D_{i,j}\}=\{E(PK_H, D_{i,j})\}$ and sign it with its secret key $SK_{DP_i}$. This signature makes sure that the package $P\{D_{i,j}\}$ was generated by the corresponding $DP_i$. In various embodiments, cryptographic signatures may be omitted.

After server 120 receives the data package $P\{D_{i,j}\}$ and its signature, it may first check whether that package is indeed sent by the corresponding $DP_i$. If it is true, server 120 unpacks the package $P\{D_{i,j}\}$, and computes the encrypted data $E(PK_H, D_{i,j})$ with regard to $F_j$ in a fully homomorphic way and obtain $E(PK_H, DM_j)=F_j(\{E(PK_H, D_{i,j})\})$(i=1, ..., I). Then server 120 may obscure $E(PK_H, DM_j)$ by multiplying a random number ra to get $E(PK_H, DM_j*ra)$ in order to hide the computation result from proxy 140.

If $RP_k$ wants to request for the result of the data processing from server 120 with regard to function $F_j$, it first may deliver the request $R_k=\{PK_{RP_k}, F_j\}$ and signs $R_k$ with its secret key $SK_{RP_k}$ to server 120. After receiving this request, server 120 first sends them to proxy 140 to check the eligibility of that $RP_k$. If the check is positive, proxy 140 may request server 120 for the obscured result $E(PK_H, DM_j*ra)$ and re-encrypt it with the $RP_k$'s public key to get $E'(PK_{RP_k}, DM_j*ra)$ associated with its signature on this data. Proxy 140, may then send the data back to server 120. After confirming that the data is sent from proxy 140, server 120 computes $E'(PK_{RP_k}, ra)$, packs it with $E'(PK_{RP_k}, DM_j*ra)$, $F_j$ and signs them with its secret key ($Sign_{CSP}=(SK_{CSP}, \{E'(PK_{RP_k}, DM_j*ra), E'(PK_{RP_k}, ra)\}))$, then it sends the package and signature to the requesting party $RP_k$. The $RP_k$ can finally get the result by first decrypting $E'(PK_{RP_k}, DM_j*ra)$ and $E'(PK_{RP_k}, ra)$ with its own secret key $SK_{RP_k}$ to get $DM_j*ra$ and ra, then the result $DM_j$, for example.

Next, the data verification phase will be described in more detail. In preparation of the verification, according to the polynomial factorization formula ($f(x)-f(a)=\Sigma_{i=1}^n(x_i-a_i)q_i(x)$), $DP_i$ decomposes $F_j' \in Z_p^I[x]=F_j(x)-F_j(D_j)$, where $x \in Z_p^I$, to generate $F_j'' \in Z_p^I[x]=\Sigma_{i=1}^I(x_i-D_{i,j})q_i(x)$(i=1, ..., I), where $q_i(x)$ are the polynomials generated by the multivariate polynomials factorization algorithm, which both correspond to $F_j$. Meanwhile, $DP_i$ chooses random data $RD_{i,j}$ and gets random data computation result $RDM_j=F_j(\{RD_{i,j}\})$ with regard to function $F_j$.

For the first time when the verifier is required to audit the data processing result provided by server 120 with regard to function $F_j$ from a $RP_k$, the verifier forwards the request to the corresponding $DP_i$ associated with its signature, e.g., through server 120. When receiving this request, $DP_i$ issues the data package $P\{RD_{i,j}\}=\{E(PK_H, RD_{i,j}), E(PK_H, RDM_j), F_j\}$ to the verifier for it to store attached to the function $F_j$. Then for the rest of the audit, the verifier may use this package to perform the auditing process all the time until that $DP_i$ is requested to refresh the package by choosing a new random data $RD_{i,j}$.

Auditing process: The key task of the auditing process is to compute the polynomial factorization formula in a fully homomorphic manner. The verifier 150 first queries server 120 to get the corresponding package $P\{D_{i,j}\}=\{E(PK_H, D_{i,j})\}$ with regard to $F_j$. Then the verifier computes function $F_j'$ and $F_j''$ both in a fully homomorphic manner, and checks if these two results are equal:

$$E(PK_H, RDM_j)-E(PK_H, DM_j) \stackrel{?}{=} \Sigma_{i=1}^I (E(PK_H, RD_{i,j})-E(PK_H, D_{i,j}))q_i(\{E(PK_H, RD_{i,j})\})(i=1, \ldots, I).$$

If the check is positive, then the result is correct, else it is wrong. Finally, the verifier issues the auditing result to the corresponding $RP_k$.

The correctness of the scheme above follows from the following: if the processing result provided by server 120 passes the auditing check, that is, $$E(PK_H, RDM_j)-E(PK_H, DM_j) \stackrel{?}{=} \Sigma_{i=1}^I (E(PK_H, RD_{i,j})-E(PK_H, D_{i,j}))q_i(\{E(PK_H, RD_{i,j})\})(i=1, \ldots, I).$$

which means that $RDM_j-DM_j=\Sigma_{i=1}^I(RD_{i,j}-D_{i,j})q_i(\{RD_{i,j}\})$(i=1, ..., I), according to the polynomial factorization formula ($f(x)-f(a)=\Sigma_{i=1}^n(x_i-a_i)q_i(x)$), since $RDM_j=F_j(\{RD_{i,j}\})$(i=1, ..., I) (computed by $DP_i$), it exists that $DM_j=F_j(\{D_{i,j}\})$(i=1, ..., I), so that the computation processed at server 120 can be indicated correct, as expected. Otherwise, the computation processed at server 120 must be erroneous.

At least some embodiments provide benefits such as, for example, privacy preservation, wherein data mining/processing/computation privacy at server 120 is improved. Server 120 cannot gain access to the plain data sent by the DPs and the plain result $DM_j$ either. Moreover, this invention further ensures that the verifier also cannot know the plain input and output of the computation in the whole verification procedure.

A further, or alternative, benefit may include authentication and non-repudiation: the invention takes advantage of digital signature to ensure the authentication and non-repudiation. It is impossible for an illegal entity to pretend to be one of the participants in the system.

A further, or alternative, benefit may include function-awareness: for each different function with which the data are computed, the invention may generate its specific verification algorithm according to the polynomial factorization formula. Thus, based on the function that the DPs want to compute on, the system can generate a proper computation and verification procedure to carry out computation verification.

A further, or alternative, benefit may include public verification: the invention enables the public to verify the computation result of the server 120 by requesting "verification input" and "verification function" to compute the verification result. The "verification input" includes encrypted raw data or encrypted processing result. Thus, these data do not expose any useful information about data providers to the public.

A further, or alternative, benefit may include generality: this invention enables data mining/processing/computation for different purposes at the cloud. This invention enables to audit data mining/processing/computation at distrusted or semi-trusted server 120 in different situations and with different processing algorithms and functions.

Figure 3:
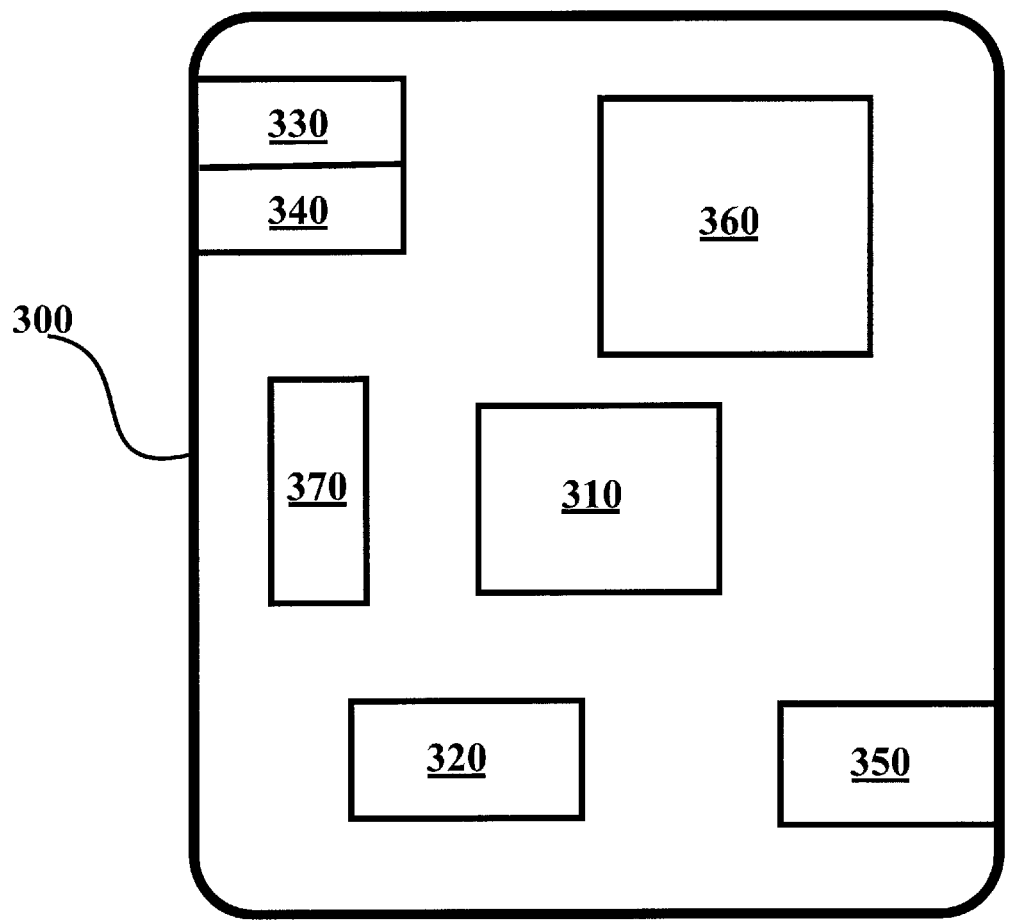
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, in suitable parts, for example, a node illustrated in FIG. 1 and/or FIG. 2. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example configure parameters relating to distributed computing.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
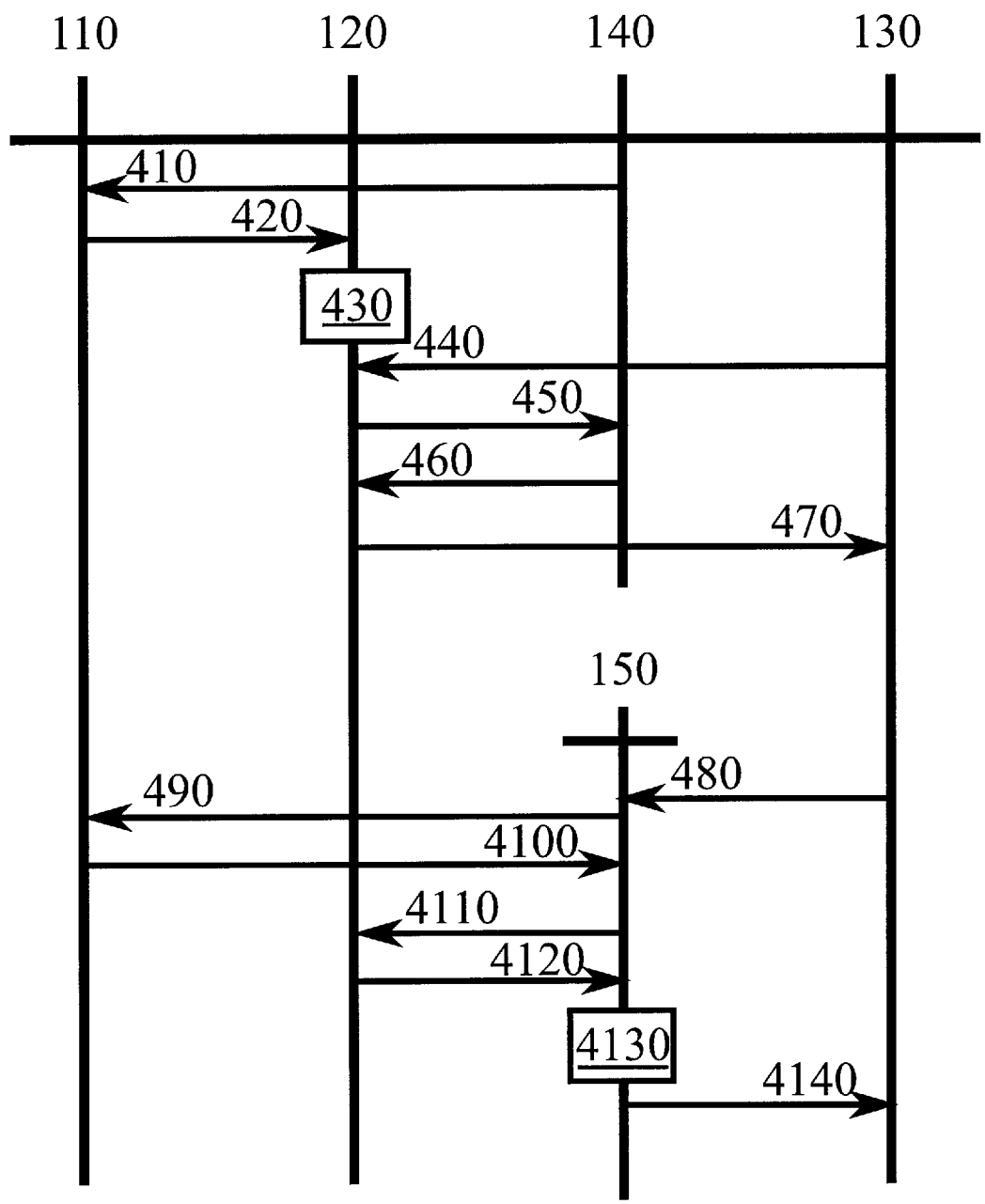
FIG. 4 illustrates signalling in accordance with at least some embodiments of the present invention.

FIG. 4 illustrates signalling in accordance with at least some embodiments of the present invention. On the vertical axes are disposed, from the left, data provider 110, server 120, proxy 140 and requesting party 130. Time advances from the top toward the bottom. In the lower part of the figure is illustrated a second signalling process relating to verification, where verifier 150 takes the place of proxy 140, since proxy 140 does not participate in the verification process. The first signalling sequence comprises phases 410 to 470, and the second signalling sequence comprises phases 480 to 4140.

In phase 410, data provider 110 receives its homomorphic encryption keys from proxy 140. In phase 420, data provider 110 provides its data, encrypted with a homomorphic encryption key, to server 120 for processing. This phase may comprise communication of a function or function identifier, to indicate the function for the requested processing. The data communicated in phase 420 may be signed by data provider 110 using a key of data provider 110.

In phase 430, server 120 performs the processing according to the request of phase 420, using homomorphic processing wherein server 120 does not gain access to an unencrypted copy of the data or result. Obscuring using random data may be performed in this phase as well. As a result of phase 430, server 130 has an encrypted copy of the processed data.

In phase 440, requesting party 130 requests to obtain the processed data by transmitting a request to server 120, or proxy 140. In FIG. 4, this request is transmitted to server 120. Server 120 may determine eligibility of requesting party 130 to obtain this data, for example server 120 may determine this by querying from proxy 140 and receiving a decision from proxy 140, for example. In case access is to be granted, server 120 may transmit, phase 450, the processed data to proxy 140 for re-encryption, such that the processed data is converted from a form where it is encrypted by a key of data provider 110 to a form where it is encrypted such that requesting party 130 may decrypt it using a private key of requesting party 130. Proxy 140 returns the re-encrypted processed data to server 120 in phase 460. Server 120 may then provide, phase 470, to requesting party 130 the re-encrypted processed data and, where obscuring is used, the random data used in the obscuring, encrypted for requesting party 130 to decrypt. In some embodiments, proxy 140 delivers the re-encrypted processed data to requesting party 130 directly in phase 460. The data communicated in phase 470 may be signed by server 120 using a key of server 120.

In the lower signalling process, verification is performed, as described herein above. In detail, in phase 480 requesting party 130 requests verification of the processing of phase 430 from verifier 150. The request may comprise the processed data in encrypted form. Responsively, verifier 150 requests a package of data from data provider 110, phase 490. Data provider 110 provides the requested package in phase 4100, this package comprising encrypted random data, encrypted function output such that the output is obtained with the random data as function input, and optionally the function identifier in case verifier 150 did not receive it in phase 480. In some embodiments, the package comprises also a decomposed representation of the function, obtained in data provider 110 using a homomorphic polynomial factorization of the function.

In phase 4110, verifier 150 requests data from server 120, and responsively in phase 4120 server 120 provides to verifier 150 an encrypted copy of the unprocessed data. In embodiments where the communication of phase 480 does not comprise the processed data, server 120 may provide a copy of the processed data to verifier 150 as well, in encrypted form, in phase 4120. The data provided in phase 4120 may be encrypted using a key of data provider 110, for example.

In phase 4130 verifier 150 may verify, whether the processing of phase 430 was correct, as described herein above. Phase 4140 comprises verifier 150 providing an indication to requesting party 130 concerning an outcome of the verification of phase 4130.

Figure 5:
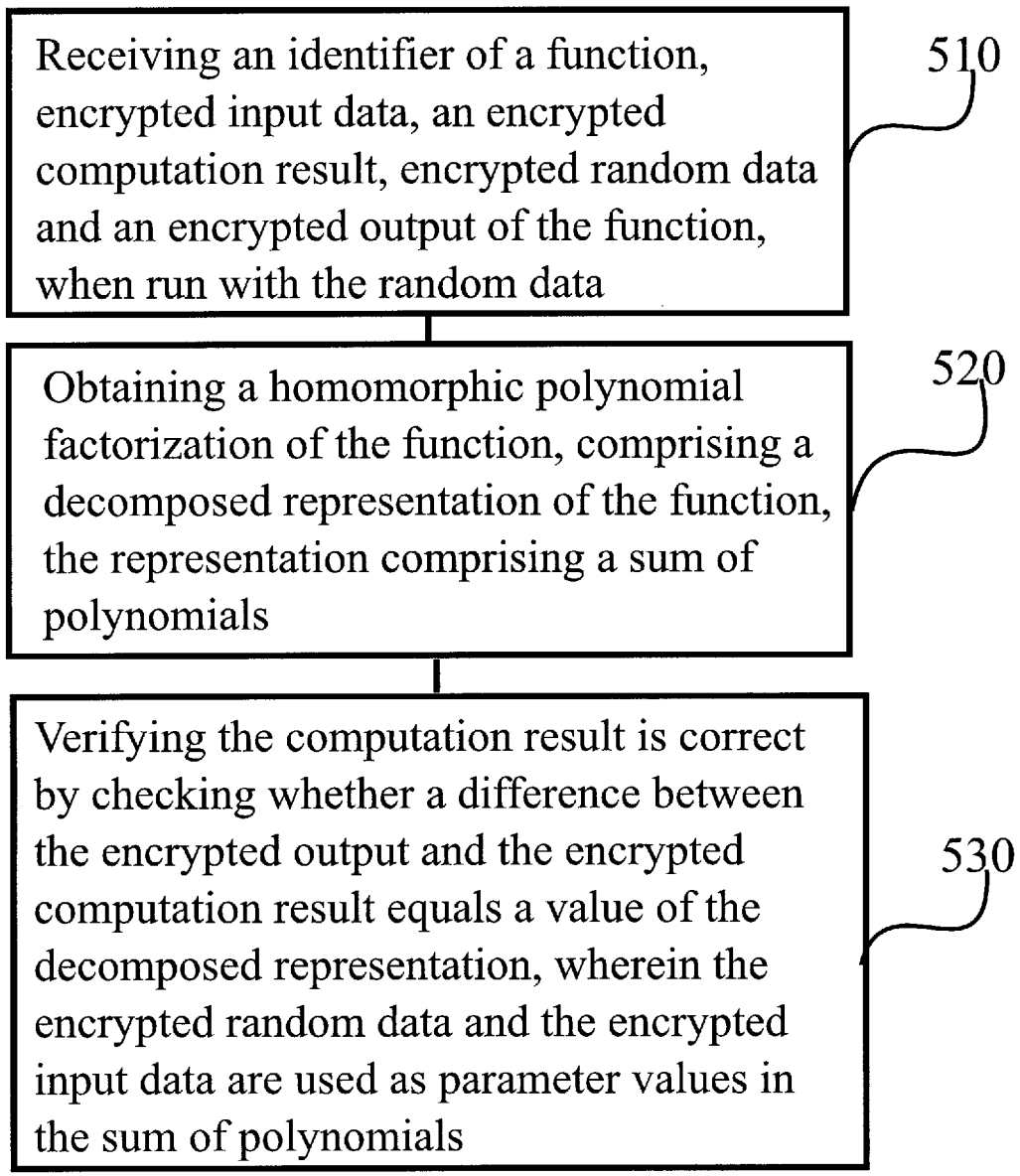
FIG. 5 is a flow graph of a method in accordance with at least some embodiments of the present invention.

FIG. 5 is a flow graph of a method in accordance with at least some embodiments of the present invention. The phases of the illustrated method may be performed in verifier 150, or in a control device configured to control the functioning thereof, when installed therein.

Phase 510 comprises receiving an identifier of a function, encrypted input data, an encrypted computation result, encrypted random data and an encrypted output of the function, when run with the random data. Phase 520 comprises obtaining a homomorphic polynomial factorization of the function, comprising obtaining a decomposed representation of the function, the representation comprising a sum of polynomials. Obtaining the decomposed representation may comprise performing the decomposition, or receiving the decomposed representation from another node, for example. Finally, phase 530 comprises verifying that the computation result is correct by checking, whether a difference between the encrypted output and the encrypted computation result equals a value of the decomposed representation, wherein the encrypted random data and the encrypted input data are used as parameter values in the sum of polynomials.

Figure 6:
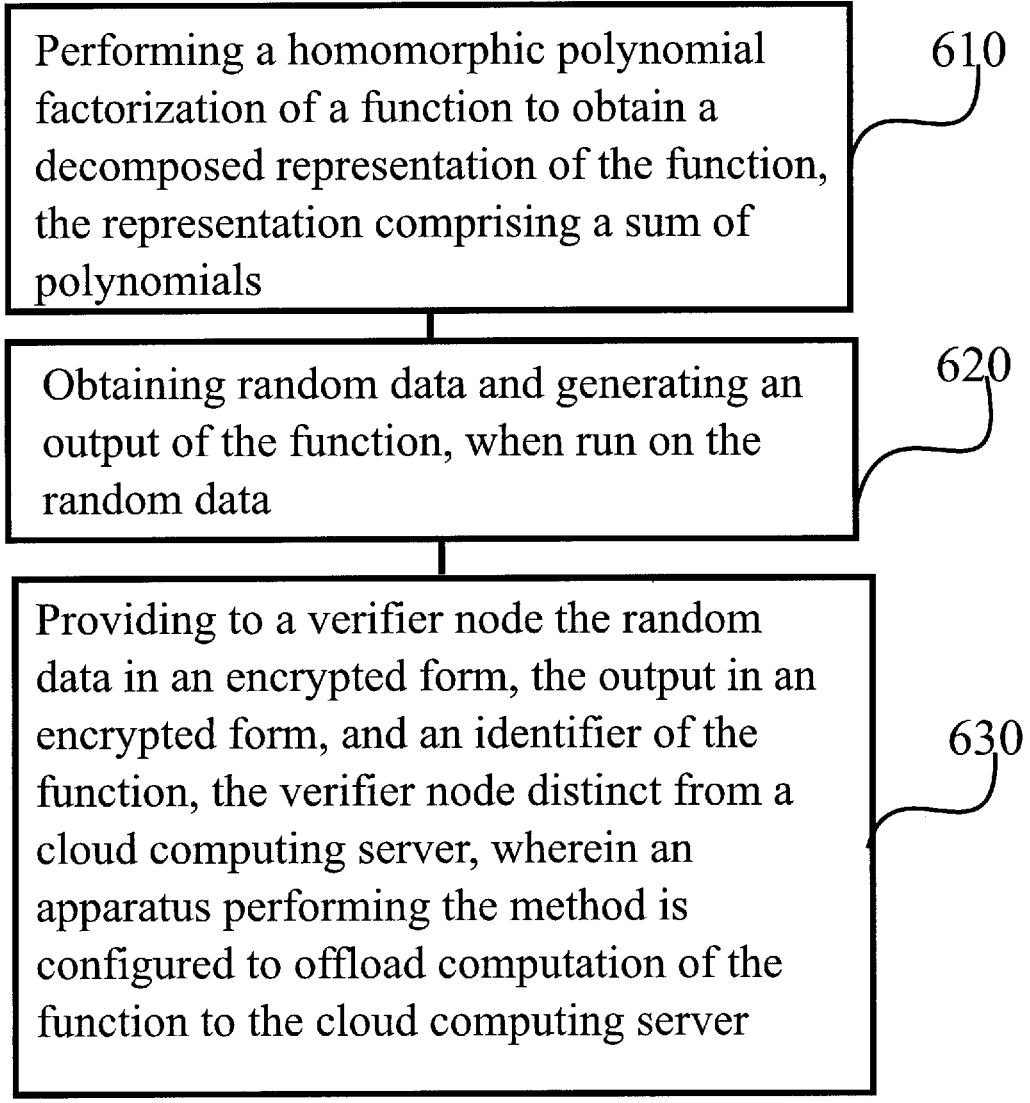
FIG. 6 is a flow graph of a method in accordance with at least some embodiments of the present invention.

FIG. 6 is a flow graph of a method in accordance with at least some embodiments of the present invention. The phases of the illustrated method may be performed in data provider 110, or in a control device configured to control the functioning thereof, when installed therein.

Phase 610 comprises performing a homomorphic polynomial factorization of the function to obtain a decomposed representation of the function, the representation comprising a sum of polynomials. Phase 620 comprises obtaining random data, and generating an output of the function, when run with the random data. Finally, phase 630 comprises providing to a verifier node the random data in encrypted form, the output in encrypted form, and an identifier of the function, the verifier node distinct from a cloud computing server, wherein an apparatus performing the method is configured to offload computation of the function to the cloud computing server.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in secure distributed computing.

ACRONYMS LIST

ABE Attribute-based Encryption
FHE Fully Homomorphic Encryption
HE Homomorphic Encryption
LWE Learning-with-errors
PCP Probabilistically Checkable Proofs
QAP Quadratic Arithmetic Programs
RLWE Ring-Learning-with-errors
SHE Somewhat Homomorphic Encryption

| REFERENCE SIGNS LIST | |
|---|---|
| 110 | Data provider (DP) |
| 120 | Server |
| 130, 135 | Requesting party |
| 140 | Proxy (for example a trusted auditor proxy) |
| 150 | Verifier |
| 300-370 | Structure of the device of FIG. 3 |
| 410-4140 | Phases of signaling procedures of FIG. 4 |
| 510-530 | Phases of the method of FIG. 5 |
| 610-630 | Phases of the method of FIG. 6 |

CITATION LIST

[1] S. Goldwasser, Y. T. Kalai, and G. N. Rothblum, "Delegating computation: Interactive proofs for muggles," in Proc. ACM Symp. Theory Comput., pp. 113-122, 2008.

[2] J. R. Thaler, "Practical verified computation with streaming interactive proofs," Ph.D. dissertation, Harvard University, 2013.

[3] S. Setty, R. McPherson, A. J. Blumberg, and M. Walfish, "Making argument systems for outsourced computation practical (sometimes)," in Pceedings of the ISOC NDSS, 2012.

[4] S. Setty, V. Vu, N. Panpalia, B. Braun, A. J. Blumberg, and M. Walfish, "Taking proof-based verified computation a few steps closer to practicality," in Proc. of USENIX Security, 2012.

[5] R. Gennaro, C. Gentry, and B. Parno, "Non-interactive verifiable computation: outsourcing computation to untrusted workers," Proc. of the 30th annual conference on Advances in cryptology (CRYPTO'10), Springer Berlin Heidelberg, pp. 465-482, 2010.

[6] D. Fiore and R. Gennaro, "Publicly verifiable delegation of large polynomials and matrix computations, with applications," in ACM conference on Computer and communications security, ACM, pp. 501-512, 2012.

[7] A. Kate, G. M. Zaverucha, and I. Goldberg, "Constant-size commitments to polynomials and their applications," in Advances in Cryptology-ASIACRYPT 2010, Springer, pp. 177-194, 2010.

[8] R. Gennaro, C. Gentry, B. Parno, and M. Raykova, "Quadratic span programs and succinct NIZKs without PCPs," in EUROCRYPT, 2013. Originally published as Cryptology ePrint Archive, Report 2012/215.

[9] S. Setty, B. Braun, V. Vu, A. J. Blumberg, B. Parno, and M. Walfish, "Resolving the conflict between generality and plausibility in verified computation," in Proc. of the ACM European Conference on Computer Systems (EuroSys), April 2013.

[10] S. Benabbas, R. Gennaro, and Y. Vahlis, "Verifiable delegation of computation over large datasets," in Proc. of the 31st annual conference on Advances in cryptology (CRYPTO'11), Springer Berlin Heidelberg, pp. 111-131, 2011.

[11] V. Vu, S. Setty, A. J. Blumbery, and M. Walfish, "A Hybrid Architecture for Interactive Verifiable Computation," Security and Privacy (SP), 2013 IEEE Symposium on, pp. 223-237, 19-22 May 2013.

[12] R. L. Rivest, L. Adleman, and M. L. Dertouzos, "On data banks and privacy homomorphisms," Foundations of Secure Computation, pp. 169-180, 1978.

[13] C. Gentry, "A fully homomorphic encryption scheme," Ph.D. dissertation, Stanford University, 2009.

[14] B. Parno, M. Raykova, and V. Vaikuntanathan, "How to delegate and verify in public: verifiable computation from attribute-based encryption," Proc. of the 9th international conference on Theory of Cryptography (TCC'12), Springer Berlin Heidelberg, pp. 422-439, 2012.

[15] M. Dijk, D. Clarke, B. Gassend, G. Edward Suh, and S. Devadas, "Speeding up Exponentiation using an Untrusted Computational Resource," Journal Designs, Codes and Cryptography, vol. 39, pp. 253-273, May 2006.

[16] D. Catalano and D. Fiore, "Practical homomorphic macs for arithmetic circuits," in Advances in Cryptology—EUROCRYPT. Springer, pp. 336-352, 2013.

[17] R. Gennaro and D. Wichs, "Fully homomorphic message authenticators," in Advances in Cryptology-ASIACRYPT, Springer, pp. 301-320, 2013.

[18] M. Backes, D. Fiore, and R. M. Reischuk, "Verifiable delegation of computation on outsourced data," in ACM conference on Computer and communications security. ACM, pp. 863-874, 2013.

[19] D. Boneh and D. M. Freeman, "Homomorphic signatures for polynomial functions," in Advances in Cryptology—EUROCRYPT. Springer, pp. 149-168, 2011.

[20] K. M. Chung, Y. Kalai, and S. Vadhan, "Improved delegation of computation using fully homomorphic encryption," in Advances in Cryptology—CRYPTO. Springer, pp. 483-501, 2010.

[21] Z. Brakerski, C. Gentry, V. Vaikuntanathan, "(Leveled) Fully Homomorphic Encryption without Bootstrapping," Acm Transactions on Computation Theory, vol. 6, no. 3, pp. 1-36, 2014.

[22] Z. Yan, X. X. Yu, W. X. Ding, "Context-aware verifiable cloud computing," IEEE Access 5: 2211-2227, 2017.

[23] B. Parno, J. Howell, C. Gentry, and M. Raykova, "Pinocchio: Nearly practical verifiable computation," in IEEE Symposium on Security and Privacy. IEEE, pp. 238-252, 2013.

[24] S. Papadopoulos, G. Cormode, A. Deligiannakis, and M. Garofalakis, "Lightweight authentication of linear algebraic queries on data streams," in International conference on Management of data. ACM, pp. 881-892, 2013.

[25] C. Gentry, D. Wichs, "Separating succinct non-interactive arguments from all falsifiable assumptions," In: Proceedings of the ACM Symposium on Theory of Computing, STOC, 2011.

[26] D. Catalano, A. Marcedone, O. Puglisi, "Linearly homomorphic structure preserving signatures: new methodologies and applications," IACR Cryptology ePrint Archive 2013:801, 2013.

[27] M. J. Atallah, and K. B. Frikken, "Securely outsourcing linear algebra computations," Proc. ACM Symposium on Information, Computer and Communications Security (ASIACCS 2010), ACM, pp. 48-59, 2010.

[28] D. Benjamin, and M. J. Atallah, "Private and cheating-free outsourcing of algebraic computations," Proc. of the 6th Annual Conference on Privacy, Security and Trust (PST '08), IEEE Computer Society, pp. 240-245, 2008.

[29] N. Attrapadung, B. Libert, T. Peters, "Computing on authenticated data: new privacy definitions and constructions," In: ASIACRYPT 2012, LNCS, vol. 7658, pp 367-385, Springer, Heidelberg, 2012.

[30] R. Canetti, B. Riva, and G. N. Rothblum, "Two 1-round protocols for delegation of computation," Cryptology ePrint Archive, Report 2011/518, 2011.

[31] C. Papamanthou, R. Tamassia, and N. Triandopoulos, "Optimal Verification of Operations on Dynamic Sets," In: Rogaway, P. (ed.) CRYPTO 2011. LNCS, vol. 6841, pp. 91-110. Springer, Heidelberg, 2011.

[32] C. Joo, A. Yun, "Homomorphic authenticated encryption secure against chosen ciphertext attack," IACR Cryptology ePrint Archive 2013: 726, 2013.

[33] C. Papamanthou, E. Shi, and R. Tamassia, "Publicly verifiable delegation of computation," Cryptology ePrint Archive, Report 2011/587, 2011.

What is claimed is:

1. An apparatus embodied by a verifier node or a control device configured to control the verifier node, the apparatus comprising at least one processor; and at least one memory including computer program code; the at least one memory and the computer program code being configured to, with the at least one processor, cause the apparatus at least to:
   receive, from a requesting party, a request for verification of processing performed by a cloud computing server;
   receive, from a data provider, an identifier of a function, encrypted random data and an encrypted output of the function, when run with the encrypted random data as an input to the function;
   receive, from the cloud computing server, encrypted input data, wherein an encrypted computation result is also received from the requesting party or the cloud computing server;
   obtain, from the data provider, a homomorphic polynomial factorization of the function, further comprising to obtain a decomposed representation of the function, the representation comprising a sum of polynomials, and
   verify that the encrypted computation result is correct by checking, whether a difference between the encrypted output and the encrypted computation result equals a value of the decomposed representation, wherein the encrypted random data and the encrypted input data are used as parameter values in the sum of the polynomials, and wherein the data provider, the requesting party, the verifier node and the cloud computing server are separate system entities within a communication network.

2. The apparatus according to claim 1, wherein each polynomial in the sum of the polynomials comprises a product of a first part and a second part, the first part comprising a difference between a first parameter and a second parameter and the second part comprising a polynomial expression involving the first parameter.

3. The apparatus according to claim 2, wherein the apparatus is further configured to assign, in obtaining the value of the sum of the polynomials, the encrypted random data as the first parameter and the encrypted input data as the second parameter.

4. The apparatus according to claim 1, wherein the apparatus is further configured to receive the encrypted computation result from the requesting party.

5. The apparatus according to claim 1, wherein the apparatus is further configured to request the identifier of the function, the encrypted random data and the encrypted output of the function from the data provider that originates the input data.

6. The apparatus according to claim 1, wherein the apparatus is further configured to request the encrypted input data from a cloud computing server.

7. The apparatus according to claim 1, wherein the apparatus is further configured to indicate a result of the verification to a node from where the apparatus received the encrypted computation result.

8. The apparatus according to claim 1, wherein the apparatus is further configured to verify a second encrypted computation result using the same encrypted random data and encrypted output.

9. An apparatus embodied by a data provider or a control device configured to control the data provider, the apparatus comprising at least one processor; and at least one memory including computer program code, the at least one memory and the computer program code being configured to, with the at least one processor, cause the apparatus at least to:
perform a homomorphic polynomial factorization of a function to obtain a decomposed representation of the function, the representation comprising a sum of polynomials;
obtain random data, and generate an output of the function, when run with the random data as an input to the function;
receive a request from a requesting party that has been forwarded by a verifier node to audit a data processing result provided by a cloud computing server with respect to the function; and
provide to the verifier node the random data in an encrypted form, the output in an encrypted form, and an identifier of the function, the verifier node distinct from the cloud computing server, wherein the apparatus is configured to offload computation of the function to the cloud computing server, and wherein the data provider, the requesting party, the verifier node and the cloud computing server are separate system entities within a communication network.

10. The apparatus according to claim 9, wherein the apparatus is further configured to provide encrypted input data and an instruction to the cloud computing server to perform the function on the encrypted input data.

11. The apparatus according to claim 9, wherein the apparatus is further configured to encrypt the output and the random data using a homomorphic encryption key received in the apparatus from a proxy node.

12. The apparatus according to claim 10, wherein the apparatus is further configured to encrypt the input data using a homomorphic encryption key received in the apparatus from a proxy node.

13. The apparatus according to claim 9, wherein the communication network is packet-based, and wherein the apparatus comprises a sensor node configured to function as part of the packet-based communication network.

14. A method performed by a verifier node or a control device configured to control the verifier node, the method comprising:
receiving, from a requesting party, a request for verification of processing performed by a cloud computing server;
receiving, from a data provider, an identifier of a function, encrypted random data and an encrypted output of the function, when run with the encrypted random data as an input to the function;
receiving, from the cloud computing server, encrypted input data, wherein an encrypted computation result is also received from the requesting party or the cloud computing server;
obtaining, from the data provider, a homomorphic polynomial factorization of the function, further comprising obtaining a decomposed representation of the function, the representation comprising a sum of polynomials, and
verifying that the encrypted computation result is correct by checking, whether a difference between the encrypted output and the encrypted computation result equals a value of the decomposed representation, wherein the encrypted random data and the encrypted input data are used as parameter values in the sum of the polynomials, and wherein the data provider, the requesting party, the verifier node and the cloud computing server are separate system entities within a communication network.

15. The method according to claim 14, wherein each polynomial in the sum of the polynomials comprises a product of a first part and a second part, the first part comprising a difference between a first parameter and a second parameter and the second part comprising a polynomial expression involving the first parameter.

16. The method according to claim 15, further comprising assigning, in obtaining the value of the sum of the polynomials, the encrypted random data as the first parameter and the encrypted input data as the second parameter.

17. The method according to claim 14, further comprising receiving the encrypted computation result from the requesting party.

18. A method performed by an apparatus embodied by a data provider or a control device configured to control the data provider, the method comprising:
performing a homomorphic polynomial factorization of a function to obtain a decomposed representation of the function, the representation comprising a sum of polynomials;
obtaining random data, and generating an output of the function, when run with the random data as an input to the function;
receiving a request from a requesting party that has been forwarded by a verifier node to audit a data processing result provided by a cloud computing server with respect to the function; and
providing to the verifier node the random data in an encrypted form, the output in an encrypted form, and an identifier of the function, the verifier node distinct from the cloud computing server, wherein an apparatus performing the method is configured to offload computation of the function to the cloud computing server, and wherein the data provider, the requesting party, the verifier node and the cloud computing server are separate system entities within a communication network.

19. The method according to claim 18, further comprising providing encrypted input data and an instruction to the cloud computing server to perform the function on the encrypted input data.

20. The method according to claim 18, further comprising encrypting the output and the random data using a homomorphic encryption key received in the apparatus from a proxy node.

* * * * *